US012136248B2

(12) United States Patent
Nakakura

(10) Patent No.: US 12,136,248 B2
(45) Date of Patent: Nov. 5, 2024

(54) REMOTE OPERATION APPARATUS FOR COMMUNICATION WITH A USER

(71) Applicant: NTT Communications Corporation, Tokyo (JP)

(72) Inventor: Toshiya Nakakura, Tokyo (JP)

(73) Assignee: NTT Communications Corporation, Tokyo (JP)

( * ) Notice: Subject to any disclaimer, the term of this patent is extended or adjusted under 35 U.S.C. 154(b) by 0 days.

(21) Appl. No.: 18/054,237

(22) Filed: Nov. 10, 2022

(65) Prior Publication Data

US 2023/0069407 A1 Mar. 2, 2023

Related U.S. Application Data

(63) Continuation of application No. PCT/JP2021/018478, filed on May 14, 2021.

(30) Foreign Application Priority Data

May 14, 2020 (JP) .................................. 2020-085324

(51) Int. Cl.
*G06V 10/56* (2022.01)
*G06F 3/14* (2006.01)
(Continued)

(52) U.S. Cl.
CPC ................ *G06V 10/56* (2022.01); *G06F 3/14* (2013.01); *G06T 7/70* (2017.01); *G06V 10/60* (2022.01);
(Continued)

(58) Field of Classification Search
CPC ....................................................... G06V 10/56
(Continued)

(56) References Cited

U.S. PATENT DOCUMENTS 6,611,242 B1 * 8/2003 Hongo .................... H04N 7/185
345/2.1
10,969,591 B2 4/2021 Nakamura
(Continued)

FOREIGN PATENT DOCUMENTS

CN 107357316 A 11/2017
JP 2008-211405 A 9/2008
(Continued)

OTHER PUBLICATIONS

International Preliminary Report on Patentability and Written Opinion issued Nov. 24, 2022, in PCT/JP2021/018478, 8 pages.
(Continued)

*Primary Examiner* — Long D Pham
(74) *Attorney, Agent, or Firm* — Oblon, McClelland, Maier & Neustadt, L.L.P.

(57) ABSTRACT

In a robot (3) in a remote location, an action scene of the robot (3) is determined based on a feature amount derived from its position and motion detection data and video data, and a video parameter or an imaging mode corresponding to the determined action scene is selected. Then, a process of adjusting the selected video parameter for the video data or a process of setting the selected imaging mode to the camera is performed, and the processed video data is transmitted to the information processing apparatus (2) on the user side via the network (4) and displayed on the HMD (1).

13 Claims, 7 Drawing Sheets

(51) Int. Cl.
  *G06T 7/70* (2017.01)
  *G06V 10/60* (2022.01)
  *G06V 20/00* (2022.01)
  *H04N 13/106* (2018.01)

(52) U.S. Cl.
  CPC .............. *G06V 20/36* (2022.01); *G06V 20/38* (2022.01); *H04N 13/106* (2018.05); *G06T 2207/10024* (2013.01)

(58) Field of Classification Search
  USPC .......................................................... 345/156
  See application file for complete search history.

(56) References Cited

U.S. PATENT DOCUMENTS

| | | | | |
|---|---|---|---|---|
| 2005/0267826 | A1* | 12/2005 | Levy | G06Q 30/04 348/E7.078 |
| 2017/0195549 | A1 | 7/2017 | Cao et al. | |
| 2019/0068749 | A1* | 2/2019 | Kasahara | H04M 1/00 |
| 2019/0212752 | A1* | 7/2019 | Fong | G06V 10/764 |
| 2020/0007746 | A1 | 1/2020 | Cao et al. | |
| 2020/0084424 | A1 | 3/2020 | Su et al. | |
| 2020/0319463 | A1 | 10/2020 | Nakamura | |
| 2022/0224865 | A1 | 7/2022 | Su et al. | |

FOREIGN PATENT DOCUMENTS

| | | |
|---|---|---|
| JP | 2016-072686 A | 5/2016 |
| JP | 2019-106628 A | 6/2019 |
| JP | 2019-198041 A | 11/2019 |

OTHER PUBLICATIONS

International Search Report issued Aug. 3, 2021 in PCT/JP2021/018478 filed on May 14, 2021, 5 pages (with English Translation).
Extended European Search Report issued Sep. 14, 2023, in corresponding European Patent Application No. 21803460.1, 9 pages.

* cited by examiner

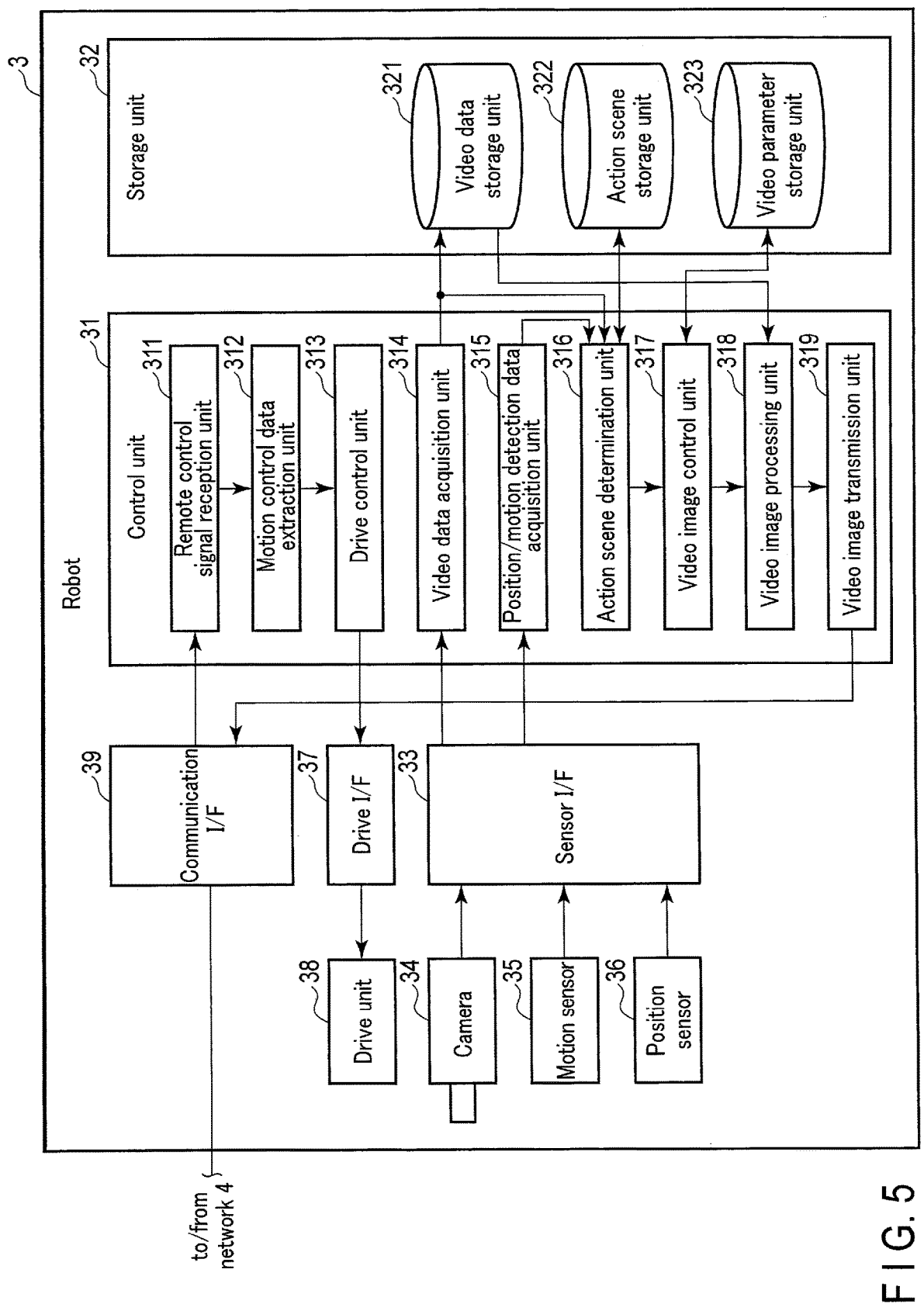
F I G. 5

<Action scene information>

| Position | Motion | Video image | Action scene |
|---|---|---|---|
| Home | Stationary<br>Moving (operating) | Book<br>Kitchen | Reading<br>Cooking |
| Library | Stationary | Book | Reading |
| Sports center | Stationary | Field, Court | Sports watching |

<Sub-scene information>

| Action scene | Video image | Sub-scene |
|---|---|---|
| Reading | Mainly monochrome | Literary book, etc. |
| | Mainly color | Reference document, etc. |
| Sports watching | Outdoors | Field game |
| | Indoors | Court game |

F I G. 9

<Video parameter information>

| Sub-scene | Video parameter |
|---|---|
| Literary book, etc. | Luminance |
| Reference document, etc. | Color tone |
| Field game | Viewing angle |
| Court game | Stereoscopic effect |

F I G. 10

REMOTE OPERATION APPARATUS FOR COMMUNICATION WITH A USER

CROSS REFERENCE TO RELATED APPLICATIONS

This application is a Continuation Application of PCT Application No. PCT/JP2021/018478, filed May 14, 2021 and based upon and claiming the benefit of priority from Japanese Patent Application No. 2020-085324, filed May 14, 2020, the entire contents of all of which are incorporated herein by reference.

FIELD

Embodiments described herein relate generally to a remote operation apparatus capable of communicating with, for example, a user apparatus via a network, and a program used in the remote operation apparatus.

BACKGROUND

A system has been developed in which a user remotely controls an operation of a robot located in a remote location, while watching a video image transmitted from the robot via a network. In a system of this type, for example, a head mounted display (HMD) (hereinafter also referred to as a headset) is put on, for example, the head of a user. A user moves his/her body or operates a controller while watching a video image captured by a robot located in a remote location through a headset, thereby remotely controlling the motion of the robot.

Furthermore, in a system of this type, for example, an augmented reality (AR) technique or a virtual reality (VR) technique is used to generate an AR video image or a VR video image based on a video image transmitted from a robot and to display the generated video image on a headset, so that a user can obtain a high sense of immersion.

CITATION LIST

Patent Literature

Patent Literature 1: Jpn. Pat. Appln. KOKAI Publication No. 2019-106628

SUMMARY

Technical Problem

However, the conventional system has the following problems to be solved. That is, in a case where a captured video image is transmitted via a network, a simple system in which a compression condition of the video image is fixed is affected by a communication environment. In particular, in a wireless environment, when a user moves to an environment in which radio waves are weak, a communication band that allows transmission within a certain period of time becomes narrow. Therefore, when a high-quality video is to be transmitted, for example, a frame may be lost to form a discontinuous video image, noise may be superimposed, or a transmission delay or the like may occur, thereby causing deterioration in transmission quality.

In order to solve this problem, a technique called Adaptive Bitrate Streaming has been conventionally devised. In this method, a communication band is estimated, and the compression degree of the video image is changed so as to fall within the estimated range. For example, the resolution of the video image is lowered to reduce the data transmission capacity.

However, in this method, even if a video image is to be positively guaranteed in either spatial resolution or time resolution, compression processing will be performed according to an algorithm of an implementation system of Adaptive Bitrate Streaming which does not take the type of the video image into consideration. Therefore, in a case where video images of various scenes are captured by a robot in a remote location and a user watches the video images using an HMD or the like as in a remote control system, it is assumed that a video image quality necessary for watching is not obtained and the system is not suitable for practical use.

The present invention has been made in consideration of the circumstances described above, and to provide a technique for improving visibility of a user by appropriately compressing a video image obtained in a remote location.

Solution to Problem

To solve the problems described above, according to a first aspect of the present invention, there is provided a remote operation apparatus capable of communicating with a user apparatus connected to a display unit via a network, the remote operation apparatus including: a video data acquisition unit configured to acquire, from a camera, video data of a target captured by the camera; a state detection data acquisition unit configured to acquire, from a sensor, state detection data representing at least one of a position or an operation of the remote operation apparatus detected by the sensor; a determination unit configured to determine an action scene of the remote operation apparatus based on the acquired video data and the acquired state detection data; a selection unit configured to select a video parameter to be adjusted in accordance with the determined action scene; a control unit configured to adjust the selected video parameter for the video data; and a transmission unit configured to transmit, to the user apparatus via the network, the video data whose video parameter has been adjusted.

According to a second aspect of the present invention, there is provided a remote operation apparatus capable of communicating with a user apparatus connected to a display unit via a network, the remote operation apparatus including: a video data acquisition unit configured to acquire, from a camera, video data of a target captured by the camera; a state detection data acquisition unit configured to acquire, from a sensor, state detection data representing at least one of a position or an operation of the remote operation apparatus detected by the sensor; a determination unit configured to determine an action scene of the remote operation apparatus based on the acquired video data and the acquired state detection data; a selection unit configured to select an imaging mode corresponding to the determined action scene; a control unit configured to set the selected imaging mode to the camera; and a transmission unit configured to transmit, to the user apparatus via the network, the video data captured by the camera using the set imaging mode.

Advantageous Effects of Invention

According to the first aspect of the present invention, in the remote operation apparatus, the action scene of the remote operation apparatus is determined based on the position or the motion of the remote operation apparatus and the captured video image, and the video parameter to be adjusted is selected in accordance with the determined action scene. Then, the selected video parameter is adjusted for the video data, and the adjusted video data is transmitted to the user apparatus. Therefore, for example, for each action scene such as a reading scene or a sports watching scene, video data is adjusted using a video parameter corresponding to the action scene and is transmitted to the user apparatus. For this reason, a remote video image compressed by the video parameter suitable for each action scene is transmitted to the user apparatus, whereby it is possible to provide the user with the remote video image having good viewability and suitable for each action scene of the remote operation apparatus.

According to the second aspect of the present invention, in the remote operation apparatus, the action scene of the remote operation apparatus is determined based on the position or the motion of the remote operation apparatus and the captured video image, and the imaging mode of the camera is selected in accordance with the determined action scene. Then, the selected imaging mode is set to the camera, and video data captured in the imaging mode is transmitted to the user apparatus via the network. Therefore, for example, for each action scene such as a reading scene or a sports watching scene, video data captured in an imaging mode corresponding to the action scene is transmitted to the user apparatus. For this reason, a remote video image having a quality suitable for each action scene is transmitted to the user apparatus, whereby it is possible to provide the user with the remote video image having good viewability and suitable for each action scene of the remote operation apparatus.

That is, according to each aspect of the present invention, it is possible to provide a technique for improving visibility of the user by appropriately compressing a video image obtained in a remote location.

BRIEF DESCRIPTION OF THE DRAWINGS

FIG. 5 is a block diagram showing a software configuration of a robot used as a remote operation apparatus in the remote control system shown in FIG. 1.

FIG. 9 is a diagram showing an example of sub-scene information stored in the storage unit shown in FIG. 5.

FIG. 10 is a diagram showing an example of video parameter information stored in the storage unit shown in FIG. 5.

DETAILED DESCRIPTION

Embodiments of the present invention will be described below with reference to the drawings.

Embodiment

Configuration Example (1) System

Figure 1:
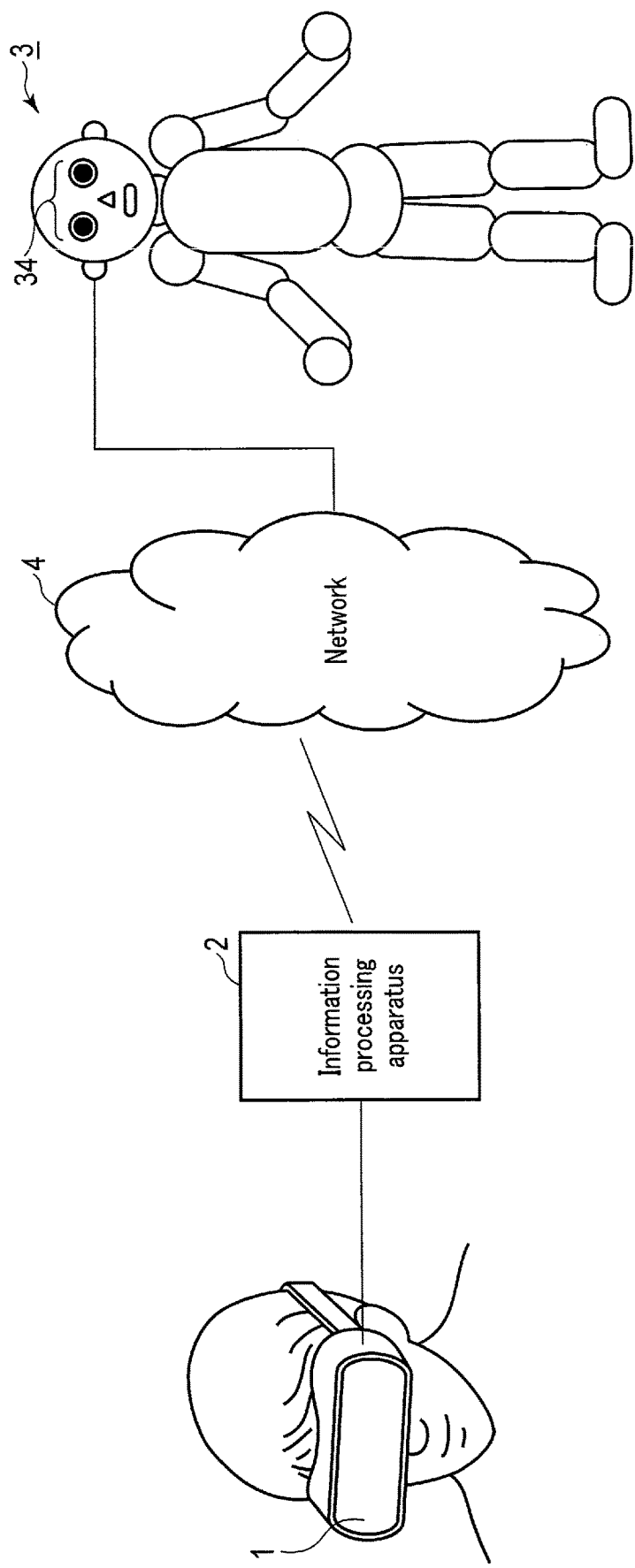
FIG. 1 is a diagram showing an overall configuration of a remote control system according to an embodiment the present invention.

FIG. 1 is a diagram showing an overall configuration of a remote control system according to an embodiment the present invention.

The remote control system according to the embodiment of the present invention includes a head mounted display (HMD) 1, an information processing apparatus 2 that operates as a user apparatus, and a remote operation apparatus 3 that enables communications with the information processing apparatus 2 via a network 4. The remote operation apparatus 3 is composed of, for example, a humanoid robot. Hereinafter, the remote operation apparatus 3 is referred to as a robot in this embodiment.

Although a case where the user apparatus includes only the information processing apparatus 2 is described here as an example in this embodiment, the user apparatus may include both the information processing apparatus 2 and the HMD 1.

The network 4 includes, for example, a public internet protocol (IP) network such as the Internet, and an access network for accessing the public IP network. The access network includes a local area network (LAN), a wireless LAN, a public wired network, a public mobile communication network, and a cable television (CATV) network.

(2) Apparatus (2-1) Head Mounted Display (HMD) 1

Figure 2:
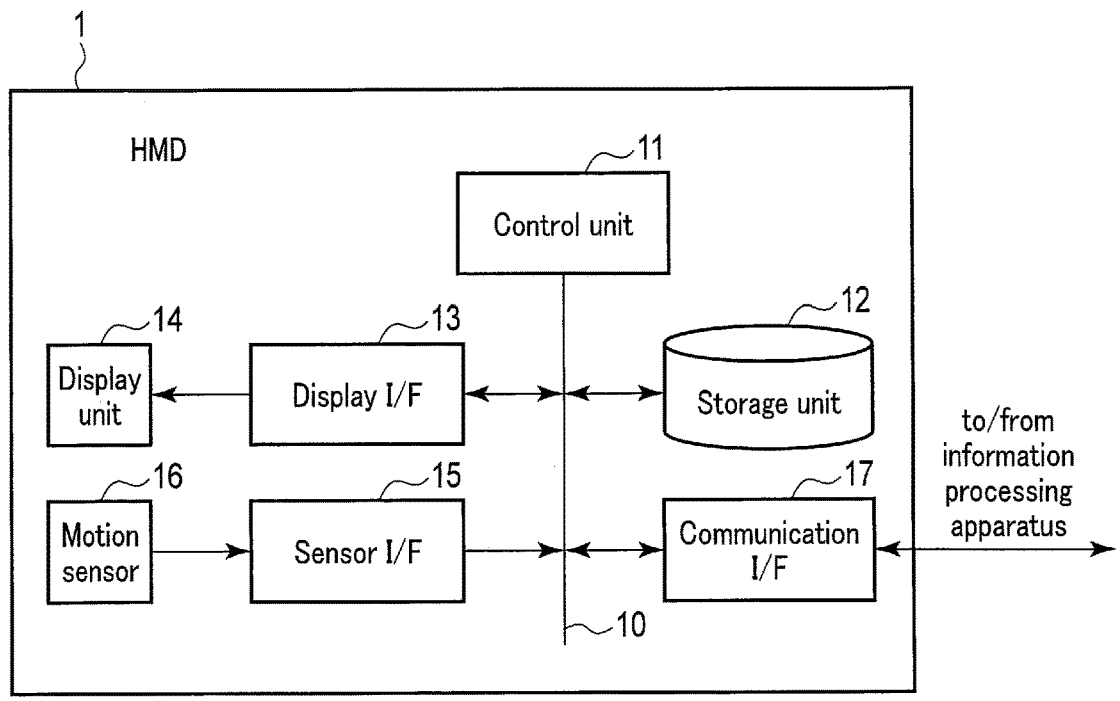
FIG. 2 is a block diagram showing a hardware configuration of a head mounted display worn by a user in the remote control system shown in FIG. 1.

The HMD 1 has a goggle shape, for example, and is detachably mounted on the head of the user. FIG. 2 is a block diagram showing a hardware configuration of the HMD 1.

In the HMD 1, a storage unit 12, a display interface (display I/F) 13, a sensor interface (sensor I/F) 15, and a communication interface (communication I/F) 17 are connected via a bus 10 to a control unit 11 including a hardware processor, for example, a central processing unit (CPU) or the like. In addition, devices such as various switches, a microphone, a speaker, a camera, and a position sensor may be connected to the control unit 11.

The storage unit 12 uses a non-volatile memory such as a solid state drive (SSD) that can be written and read at any time as a storage medium, and includes a program storage area and a data storage area. Application programs for realizing operations of the HMD 1 are stored in the program storage area. The data storage area is used to store various data acquired or generated in the course of operations of the HMD 1. As the storage medium, a read only memory (ROM), a random access memory (RAM), or the like may also be used in combination.

A display unit 14 is connected to the display I/F 13. The display unit 14 includes, for example, two display panels including an organic electro luminescence (EL) display so as to correspond to left and right eyes of the user in order to support virtual reality (VR) display. The number of display panels may be one. The display unit 14 is not limited to the organic EL display, and may be another type of display such as a liquid crystal display (LCD) or a display using seven segments. The display I/F 13 causes the display unit 14 to display video data generated by the information processing apparatus 2 which is described later.

A motion sensor 16 is connected to the sensor I/F 15. The motion sensor 16 includes, for example, a six-axis angular velocity sensor (gyro sensor), and is used to detect a motion of the HMD 1, that is, a motion of the head of the user. The motion of the head to be detected is preferably, for example, a motion in six axis directions, but may be a motion in only two axis directions of pan and tilt. The sensor I/F 15 generates motion detection data representing the motion of the head of the user based on an output signal from the motion sensor 16.

In addition to the motion sensor 16, a magnetic sensor, an acceleration sensor, a position sensor, an infrared sensor, a luminance sensor, a proximity sensor, a camera, or the like may be connected to the sensor I/F 15. In addition to the motion of the head of the user, a sensor for detecting a motion of the line of sight of the user may be connected to the sensor I/F 15. The motion of the line of sight of the user can be detected, for example, with a camera that captures an image of the user's eyeball.

As the communication I/F 17, for example, a wired interface using a signal cable such as a universal serial bus (USB) cable is used. Under the control of the control unit 11, the communication I/F 17 receives the video data transmitted from the information processing apparatus 2 and transfers the motion detection data or the like generated by the sensor I/F 15 to the information processing apparatus 2. Note that a short-range wireless data communication standard (for example, Bluetooth (registered trademark)) may be used for the communication I/F 17.

In this example, a multi-function device including the control unit 11 and the storage unit 12 is described as an example of the HMD 1. However, the HMD 1 may be a standard or simplified device having only the display unit 14, the display I/F 13, the motion sensor 16, and the sensor I/F 15.

(2-2) Information Processing Apparatus 2

Figure 3:
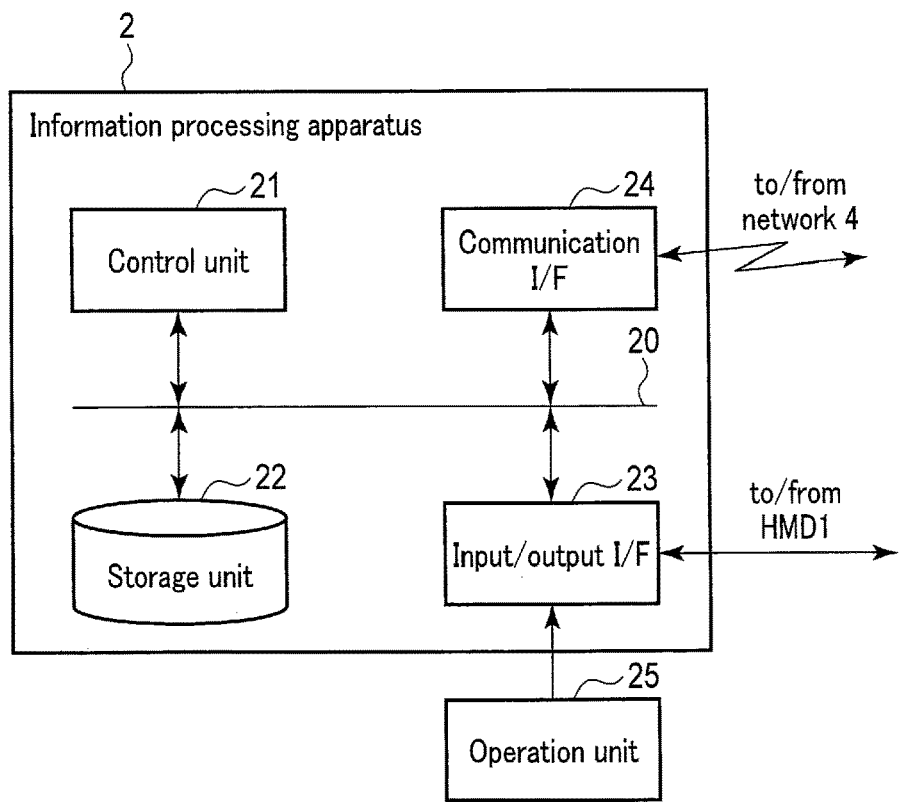
FIG. 3 is a block diagram showing a hardware configuration of an information processing apparatus used as a user apparatus in the remote control system shown in FIG. 1.

FIG. 3 is a block diagram showing a hardware configuration of the information processing apparatus 2 used as a user apparatus.

The information processing apparatus 2 is configured by, for example, a mobile information terminal such as a smartphone or a tablet terminal, or a notebook or stationary personal computer. In the information processing apparatus 2, a control unit 21 including a hardware processor such as a CPU is connected via a bus 20 to a storage unit 22, an input/output interface (input/output I/F) 23, and a communication interface (communication I/F) 24.

The HMD 1 is connected to the input/output I/F 23 via the USB cable or a wireless interface. An operation unit 256 such as a controller is connected to the input/output I/F 23. The operation unit 25 is used to input a control target portion, a control direction, and a control amount when the user remotely controls the operation of the robot 3.

The communication I/F 24 includes an interface supporting, for example, a wireless LAN, a short-range wireless data communication standard (for example, Bluetooth (registered trademark)), or a public mobile communication network, and performs data transmission with the robot 3 via the network 4. The communication I/F 24 may include an interface supporting a wired network such as a public wired network, a wired LAN, or a CATV network.

The storage unit 22 is configured by combining, as a storage medium, for example, a non-volatile memory such as a hard disk drive (HDD) or an SSD that can be written and read at any time, a non-volatile memory such as a ROM, and a volatile memory such as a RAM. The storage area includes a program storage area and a data storage area. The program storage area stores middleware, such as an operating system (OS), and in addition, application programs necessary for executing various control processes according to this embodiment of the present invention. The data storage area includes a video data storage area for temporarily storing video data sent from the robot 3 and a working storage area to be used by the control unit 21 to perform various processing tasks.

The control unit 21 includes a remote control signal transmission unit, a video data reception unit, and a video image display control unit as control processing functions for realizing the embodiment of the present invention. These control processing functions are all realized by causing the hardware processor of the control unit 21 to execute application programs stored in the program storage area in the storage unit 22.

The remote control signal transmission unit generates motion control data for controlling the motion of the robot 3 based on the operation data input from the operation unit 25 and the motion detection data obtained by the motion sensor 16 of the HMD 1. The motion control data includes information representing a control target portion, a control direction, and a control amount of the robot 3. Then, the remote control signal including the generated motion control data is transmitted from the communication I/F 24 to the robot 3.

The video data reception unit receives, via the communication I/F 24, the video data sent from the robot 3 via the network 4. Then, the received video data is decoded and temporarily stored in the video data storage area in the storage unit 22.

The video image display control unit performs video image edition processing for AR display or VR display on the video data read from the video data storage area, if necessary, and then outputs the video data from the input/output I/F 23 to the HMD 1 for display.

(2-3) Robot 3

The robot 3 includes, for example, a body, a head, arms, and legs as shown in FIG. 1. Among these, each the head, the arm, and the legs is configured to operate within a predetermined movable range by a drive unit including a servo mechanism, so that the posture of the robot 3 can be variously changed. A camera 34 as an imaging device is disposed in, for example, a front portion of the head of the robot 3, that is, a portion corresponding to the face. A motion sensor is provided in the head of the robot 3 to detect its motion.

Figure 4:
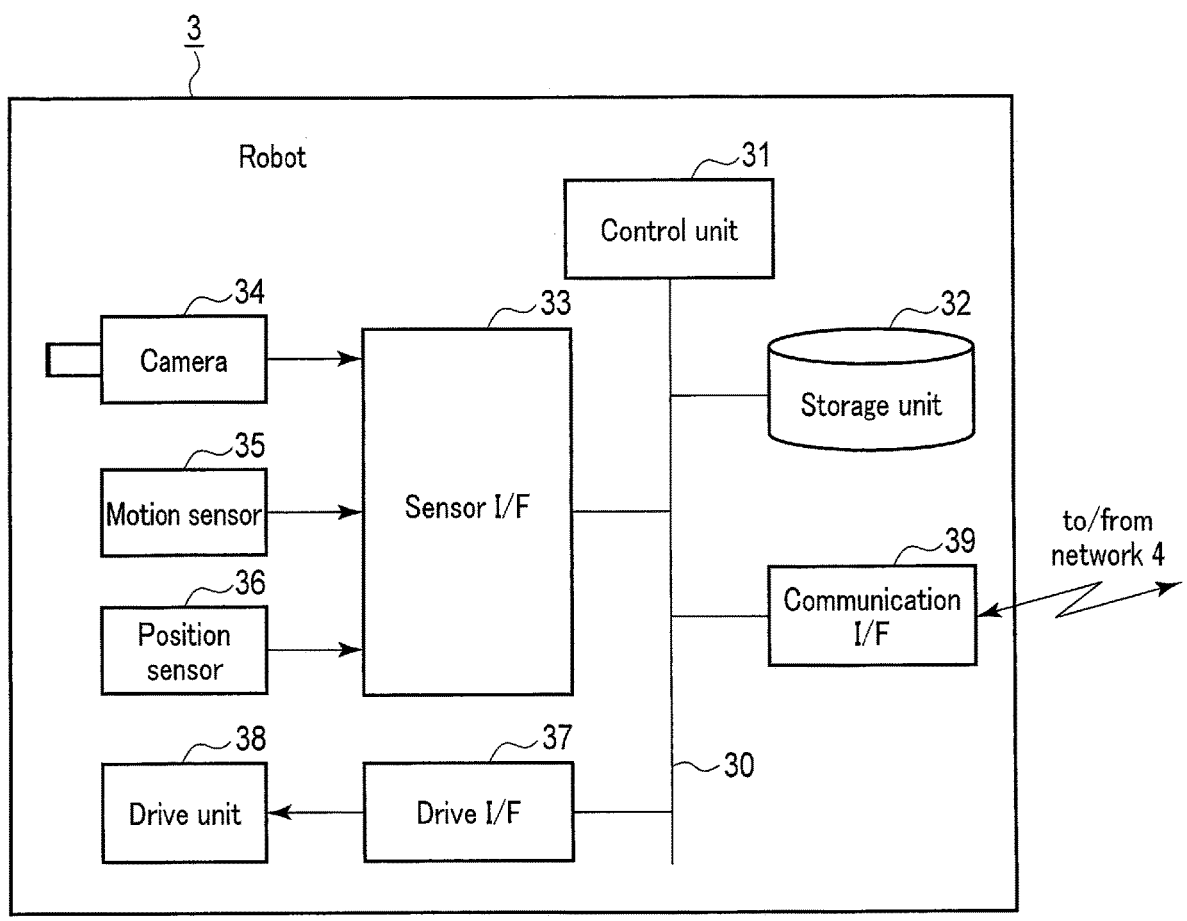
FIG. 4 is a block diagram showing a hardware configuration of a robot used as a remote operation apparatus in the remote control system shown in FIG. 1.

FIGS. 4 and 5 are block diagrams respectively showing a hardware configuration and a software configuration of the robot 3.

The robot 3 includes a control unit 31. The control unit 31 includes a hardware processor such as a CPU. A storage unit 32, a sensor interface (sensor I/F) 33, a drive interface (drive I/F) 37, and a communication interface (communication I/F) 39 are connected to the control unit 31 via a bus 30.

The camera 34, a motion sensor 35, and a position sensor 36 are connected to the sensor I/F 33. The camera 34 includes, for example, a twin-lens camera capable of capturing a stereoscopic video image and a panoramic camera capable of capturing a panoramic video image. The twin-lens camera captures an image in the front direction of the robot 3 within a predetermined viewing angle (for example, 130 degrees), and outputs the obtained stereoscopic video data to the sensor I/F 33. The panoramic camera captures an image of a range covering the front direction and both side directions of the robot 3 at a viewing angle (for example, 180°) larger than that of the twin-lens camera, and outputs the obtained panoramic video data to the sensor I/F 33.

The motion sensor 35 includes, for example, a six-axis acceleration sensor, detects a motion in six axis directions of the head of the robot 3, and outputs the detected data to the sensor I/F 33. The position sensor 36 measures the position of the robot 3 using, for example, a global positioning system (GPS), and outputs the measured position data to the sensor I/F 33.

A drive unit 38 for driving the head, the arms, and the legs is connected to the drive I/F 37. The drive I/F 37 converts a control signal output from the control unit 31 into a drive signal, and outputs the converted drive signal to the drive unit 38 to operate the drive unit 38.

The communication I/F 39 includes an interface conforming to, for example, a wireless LAN, a short-range wireless data communication standard (for example, Bluetooth (registered trademark)), or a public mobile communication network, and performs data transmission with the information processing apparatus 2 via the network 4. The communication I/F 30 may include an interface conforming to a wired network such as a public wired network, a wired LAN, or a CATV network.

The storage unit 32 comprises a non-volatile memory, such as an SSD, that can be written and read at any time, a ROM, and a RAM, and includes a program storage area and a data storage area. The program storage area stores middleware such as an OS, and in addition, various application programs necessary for realizing operations of the robot 3.

The data storage area includes a video data storage unit 321, an action scene storage unit 322, and a video parameter storage unit 323.

The video data storage unit 321 functions as a buffer memory that temporarily stores video data captured by the camera 34 in order to perform video image processing which is described later.

The action scene storage unit 322 includes a first table that stores information representing a plurality of scenes assumed as action scenes of the robot 3 and a second table that stores information representing a plurality of sub-scenes obtained by further subdividing the action scenes. In the first table, information representing an assumed action scene of the robot 3 is stored in association with a combination of the position and the motion of the robot 3 and the video image of the camera 34. In the second table, information representing a plurality of sub-scenes assumed from the video image for each of the action scenes defined in the first table. The information representing the action scene and the information representing the sub-scene will be described later with examples.

Note that the action scene information and the sub-scene information thereof may be stored in the table in advance by an administrator or the like, or may be appropriately acquired from, for example, a scheduler of a terminal device of a user or another system that predicts an action of the user and stored in the table. In this way, it is possible to appropriately estimate the action of each user and to set the action scene information and the sub-scene information according to the estimated action.

For example, in a case where a schedule of a meeting is described in the scheduler, video parameters can be adjusted to settings corresponding to reading to read conference materials. In a case where a schedule of watching a baseball game is described in the scheduler, video parameters can be adjusted to settings corresponding to sports watching.

The video parameter storage unit 323 stores a video parameter preset for a sub-scene in association with the sub-scene for each of the action scenes. The video parameter will also be described later by way of example.

The control unit 31 includes, as processing function units according to the embodiment of the present invention, a remote control signal reception unit 311, a motion control data extraction unit 312, a drive control unit 313, a video data acquisition unit 314, a position/motion detection data acquisition unit 315, an action scene determination unit 316, a video image control unit 317, a video image processing unit 318, and a video image transmission unit 319. Each of these control processing units is realized by causing the hardware processor of the control unit 31 to execute a program stored in the storage unit 32.

The remote control signal reception unit 311 performs a process of receiving a remote control signal transmitted through the network 4 from the information processing apparatus 2 via the communication I/F 39 and transferring the received remote control signal to the motion control data extraction unit 312.

The motion control data extraction unit 312 performs a process of extracting motion control data from the remote control signal and transferring the motion control data to the drive control unit 313.

The drive control unit 313 selects the corresponding drive unit 38 on the basis of the information specifying the control target portion included in the extracted motion control data, and generates a drive control signal for driving the selected drive unit 38 on the basis of the information specifying the control direction and the control amount included in the motion control data. Then, the drive control unit 313 performs a process of outputting the generated drive control signal to the drive I/F 37. The drive I/F 37 generates a drive signal based on the drive control signal and supplies the drive signal to the drive unit 38.

The video data acquisition unit 314 performs a process of capturing via the sensor I/F 33 stereoscopic video data or panoramic video data imaged by the camera 34 and temporarily storing the captured video data in the video data storage unit 321 for video image processing to be described later.

The position/motion detection data acquisition unit 315 performs a process of acquiring, via the sensor I/F 33, the position data detected by the position sensor 36 and the motion detection data representing the motion of the head of the robot 3 detected by the motion sensor 35.

The action scene determination unit 316 extracts feature amounts respectively from the position data and the motion detection data acquired by the position/motion detection data acquisition unit 315 and the video data acquired by the video data acquisition unit 314. Then, based on the extracted feature amounts, the action scene determination unit 316 refers to the action scene storage unit 322 and performs a process of determining the current action scene of the robot 3 and its sub-scene.

The video image control unit 317 selects the video parameters corresponding to the action scene and the sub-scene from the video parameter storage unit 323 based on the action scene and the sub-scene determined by the action scene determination unit 316. Then, the video parameters are given to the video image processing unit 318.

The video image processing unit 318 reads the video data from the video data storage unit 321 and performs a process of adjusting the video parameters given from the video image control unit 317 on the video data. An example of the process of adjusting the video parameters will be described in detail later.

The video image transmission unit 319 transmits the video data that has been processed by the video image processing unit 318 from the communication I/F 39 to the information processing apparatus 2.

Operation Example

Figure 6:
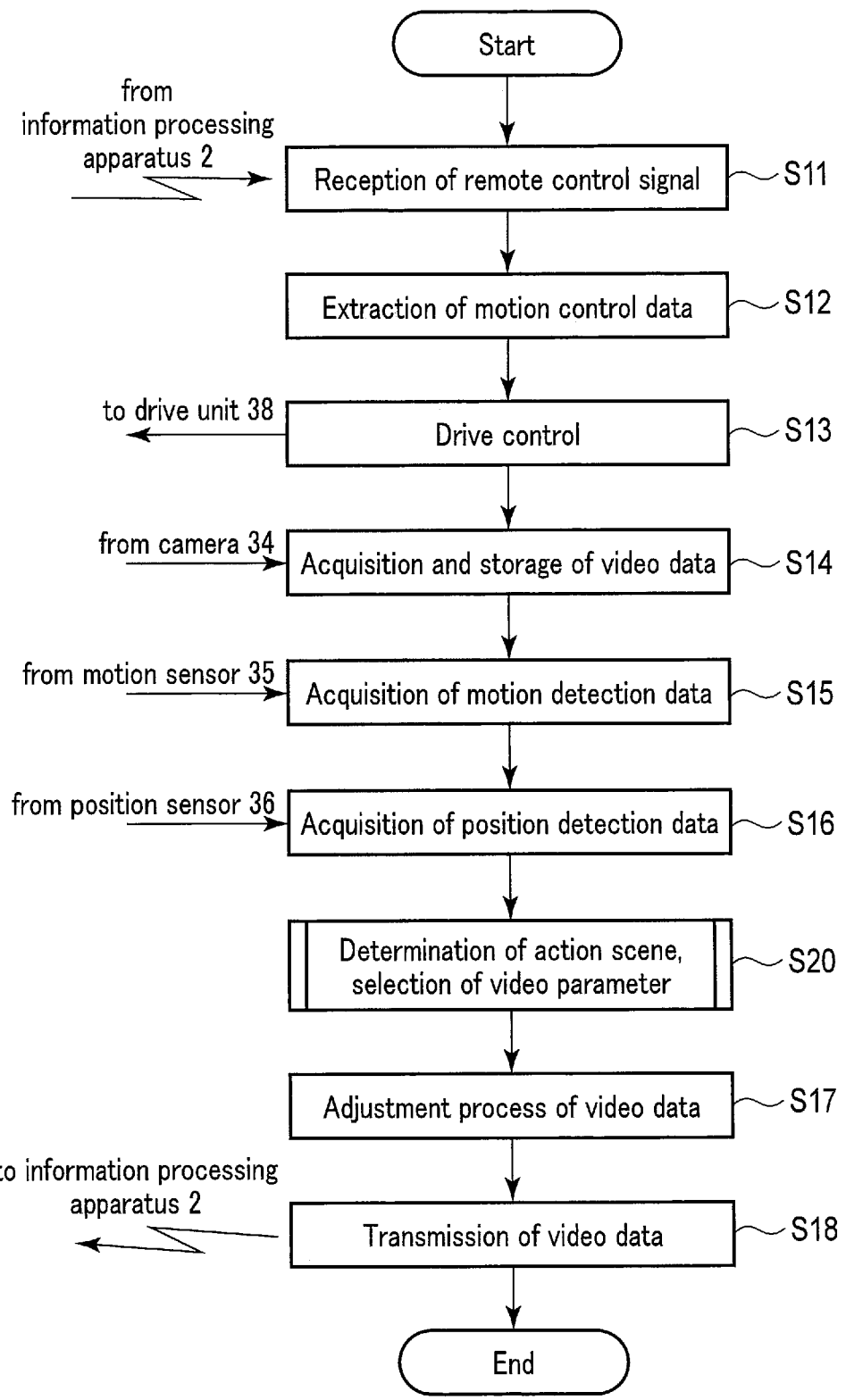
FIG. 6 is a flowchart showing procedures and details of processing executed by the robot shown in FIG. 5.

Next, an operation example of the robot 3 having the aforementioned configuration will be described. FIG. 6 is a flowchart showing an example of an overall procedure and details of processing executed by the robot 3.

When the remote control signal including the motion control data is sent from the information processing apparatus 2, the robot 3 receives the remote control signal via the communication I/F 39 in step S11 under the control of the remote control signal reception unit 311. Then, under the control of the motion control data extraction unit 312, the robot 3 extracts the motion control data from the remote control signal in step S12.

Next, under the control of the drive control unit 313, in step S13, the robot 3 selects the corresponding drive unit 38 based on the information specifying the control target portion included in the motion control data. Then, on the basis of the information specifying the control direction and the control amount included in the motion control data, the robot 3 generates a drive control signal for driving the selected drive unit 38 and outputs the generated drive control signal to the drive I/F 37. As a result, the drive signal is supplied from the drive I/F 37 to the drive unit 38, and the drive unit 38 is driven to operate the corresponding portion.

For example, if the control target portion is the head, the corresponding drive unit 38 is driven to change the direction of the head, for example, in a pan direction or a tilt direction. If the control target portion is the legs, the corresponding drive unit 38 is driven, and the robot 3 performs a walking motion in, for example, the front-rear direction. Other portions operate in the same manner in response to the drive control signal.

On the other hand, in a state where the legs or the head is moving, under the control of the video data acquisition unit 314, in step S14, the control unit 31 of the robot 3 captures video data from the camera 34 mounted on the head via the sensor I/F 33 and temporarily stores the video data in the video data storage unit 321.

At the same time, under the control of the position/motion detection data acquisition unit 315, in step S15, the control unit 31 of the robot 3 captures motion detection data representing a change in motion of the head of the robot 3 from the motion sensor 35 via the sensor I/F 33. In step S16, the control unit 31 of the robot 3 captures position data indicating the current position of the robot 3 from the position sensor 36 via the sensor I/F 33.

Figures 7, 8:
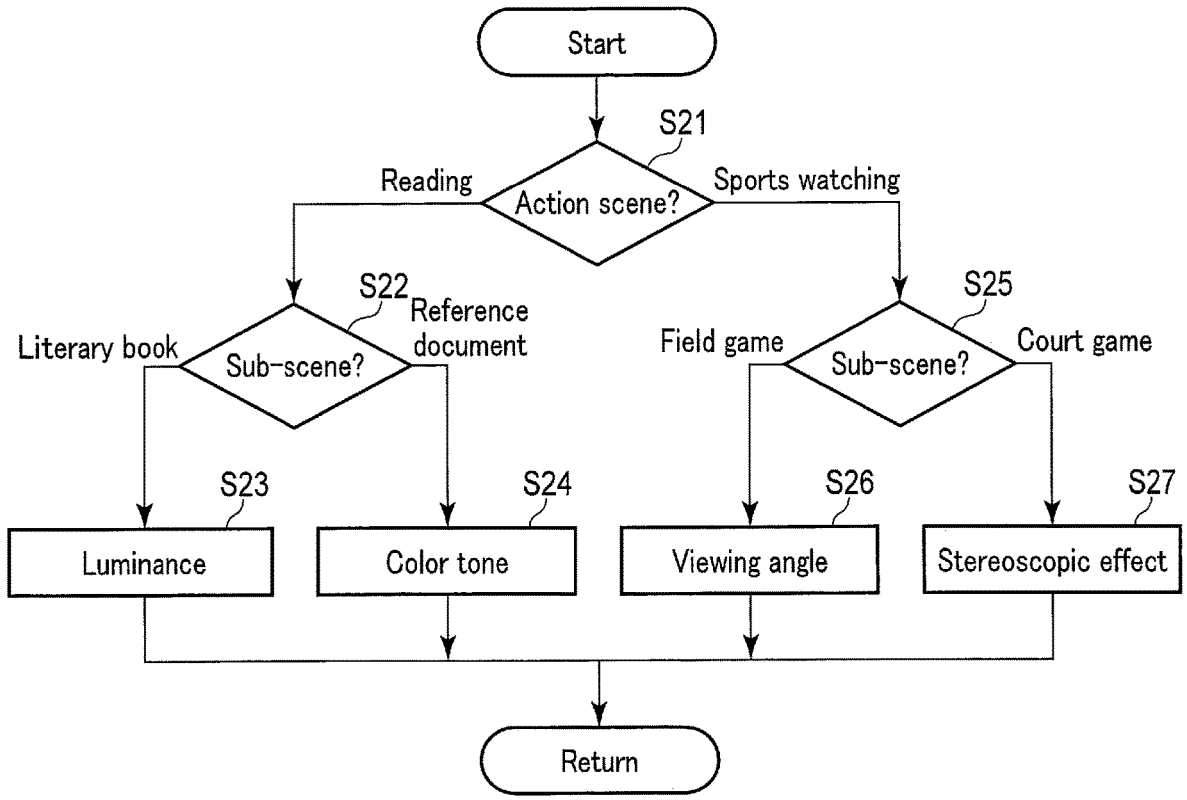
FIG. 7 is a flowchart showing procedures and details of action scene determination processing and video parameter selection processing in the procedures of the robot shown in FIG. 6.
FIG. 8 is a diagram showing an example of action scene information stored in a storage unit shown in FIG. 5.

Next, under the control of the action scene determination unit 316 and the video image control unit 317, in step S20, the control unit 31 of the robot 3 executes processing of determination of the current action scene of the robot 3 and selection of the video parameters as follows. FIG. 7 is a flowchart showing the procedures and details of the processing.

Specifically, first, in step S21, the action scene determination unit 316 determines feature amounts respectively from the position data and the motion detection data acquired by the position/motion detection data acquisition unit 315 and the video data acquired by the video data acquisition unit 314. Then, the action scene determining unit 316 searches the action scene storage unit 322 based on each determined feature amount, and determines the action scene of the robot 3.

For example, suppose that the action scene information shown in FIG. 8 is stored in the first table of the action scene storage unit 322. In this state, the action scene determination unit 316 first determines that the feature amount indicating the position of the robot 3 is "home" based on the position data and map data stored in the storage unit 32. Further, based on the motion detection data, the action scene determination unit 316 determines that the feature amount indicating the motion of the robot 3 is "stationary state". Further, the action scene determination unit 316 determines a "book" appearing in the video data as a feature amount. Then, the action scene determination unit 316 determines that the current action scene of the robot 3 is "reading" based on the action scene information shown in FIG. 8, stored in the first table of the action scene storage unit 322.

Similarly, if the feature amount of the current position of the robot 3 is "library", the feature amount of the motion of the robot 3 is determined to be "stationary state", and the feature amount extracted from the video image is "book", the action scene determination unit 316 determines that the action scene of the robot 3 at this time is also "reading" based on the action scene information shown in FIG. 8. If the feature amount of the current position of the robot 3 is "home", the feature amount of the motion of the robot 3 is determined to be "operating state", and the feature amount extracted from the video image is "kitchen", the action scene determination unit 316 determines that the action scene of the robot 3 at this time is "cooking".

On the other hand, suppose that the feature amount of the current position of the robot 3 is determined to be "sports center" based on the position data and the map data stored in the storage unit 32, the feature amount of the motion of the robot 3 is determined to be "stationary state" based on the motion detection data, and the feature amount extracted from the video data is "field or court". In this case, the action scene determination unit 316 determines that the current action scene of the robot 3 is "sports watching" based on the action scene information shown in FIG. 8.

If "reading" is determined in step S21, then in step S22, the action scene determination unit 316 determines a sub-scene subdivided from the reading scene based on the feature amount extracted from the video data and the sub-scene information stored in the second table of the action scene storage unit 322.

For example, suppose that the sub-scene information as illustrated in FIG. 9 is stored in the second table and the image of "book" which is the feature amount extracted from the video data is "mainly monochrome". In this case, the action scene determination unit 316 determines that the sub-scene is a reading scene of "literary book" such as an independent book or a paperback book. On the other hand, suppose that the image of "book" which is the feature amount extracted from the video data is "mainly color". In this case, the action scene determination unit 316 determines that the sub-scene is a reading scene of "reference document" such as a gravure, a picture book, or a pictorial book.

When the sub-scene is determined as described above, next, under the control of the video image control unit 317, the control unit 31 of the robot 3 refers to the video parameter storage unit 323 and selects a video parameter set in accordance with the sub-scene.

For example, it is assumed that the video parameter information shown in FIG. 10 is stored in the video parameter storage unit 323. In this case, if the determined sub-scene is "literary book", the video image control unit 317 selects in step S23 "luminance" together with "spatial resolution" as a video parameter to be given a higher priority when the literary book is read with the video image. On the other hand, if the determined sub-scene is "reference document", the video image control unit 317 selects in step S24 "color tone" together with "spatial resolution" as a video parameter to be given a higher priority when the reference document is read with a video image.

When the video parameter is selected, the control unit 31 of the robot 3 performs a process of adjusting the selected video parameter on the video data read from the video data storage unit 321 in step S17 under the control of the video image processing unit 318. Then, the adjusted video data is transmitted from the communication I/F 39 to the information processing apparatus 2 in step S18 under the control of the video image transmission unit 319.

For example, in a case where "spatial resolution" and "luminance" are selected as the video parameters, the video image processing unit 318 performs video image processing on the video data so that, for example the spatial resolution becomes a preset high resolution, and further performs processing for increasing the luminance to a predetermined level. Then, the video image transmission unit 319 transmits the processed video data to the information processing apparatus 2. On the other hand, in a case where "spatial resolution" and "color tone" are selected as the video parameters, the video image processing unit 318 performs video image processing on the video data so that, for example, the spatial resolution becomes a preset high resolution, and further performs processing for increasing the color saturation to a predetermined level. Then, the video image transmission unit 319 transmits the video data after the video image processing to the information processing apparatus 2.

As a result, in a case of reading, through the HMD 1, a book imaged by the robot 3, the user can visually recognize characters from the video image with clarity set to a high resolution and a high luminance if the book is a literary book. On the other hand, in a case of reading a reference document such as a picture book or a pictorial book, the user can visually recognize a picture or a photograph from the video image with clarity having a high resolution and an increased saturation.

As a method of adjusting the "luminance", a method of adjusting a so-called diaphragm function of the camera may be used in addition to the method of adjusting the "luminance" with respect to the video data.

On the other hand, if the action scene of the robot 3 is determined to be "sports watching" in step S21, then in step S25, the action scene determination unit 316 determines a sub-scene which is a sub-division of "sports watching" based on the video data and the sub-scene information stored in the second table of the action scene storage unit 322.

For example, if the feature amount extracted from the video data is "outdoors", the action scene determination unit 316 determines watching of "field game" such as soccer or rugby as a sub-scene. On the other hand, if the feature amount extracted from the video data is "indoors", the action scene determination unit 316 determines watching of "court game" such as basketball or volleyball as a sub-scene.

Then, upon determination of the sub-scene, under the control of the video image control unit 317, the control unit 31 of the robot 3 refers to the video parameter storage unit 323 and selects the video parameter set in accordance with the sub-scene.

For example, if the sub-scene is determined to be "field game", the video image control unit 317 selects in step S26 "time resolution" and "viewing angle" as the video parameters to be given a higher priority when watching the field game with the video image. On the other hand, if the sub-scene is determined to be "court game", the video image control unit 317 selects in step S27 "time resolution" and "stereoscopic effect" as the video parameters to be given a higher priority when watching the court game with the video image.

Next, in step S17, under the control of the video image processing unit 318, the control unit 31 of the robot 3 performs a process of adjusting the selected video parameter on the video data. Then, under the control of the video image transmission unit 319, the video data whose video parameters have been adjusted is transmitted from the communication I/F 39 to the information processing apparatus 2 in step S18.

For example, in a case where "time resolution" and "viewing angle" are selected as the video parameters, the video image processing unit 318 selectively reads out panoramic video data having a high frame rate and a large viewing angle from the video data storage unit 321. Then, the video image transmission unit 319 transmits the panoramic video data to the information processing apparatus 2. On the other hand, in a case where "time resolution" and "stereoscopic effect" are selected as the video parameters, the video image processing unit 318 selectively reads out stereoscopic video data having a high frame rate and a stereoscopic effect from the video data storage unit 321. Then, the video image transmission unit 319 transmits the stereoscopic video data to the information processing apparatus 2.

Note that the selection between the panoramic video image and the stereoscopic video image may be performed by providing an imaging mode switching instruction to the camera 34 and switching video data to be output from the camera 34. In addition, in a case where the frame rate is insufficient with only the panoramic video image, the panoramic video image and the stereoscopic video image may be combined with the coordinate positions aligned with each other. However, in a case of watching a field game, since the distance from the camera to the field is generally long, even if the frame rate is not so high, the influence on viewing is small.

As described above, in a case where the user tries to view, via the HMD 1, a video image of a field game captured by the robot 3 in a stadium or the like, the user can view the video image over a wide range without omission by the panoramic video image of a wide viewing angle. On the other hand, in a case where the user tries to view, via the HMD 1, a video image of a court game captured by the robot 3 in an arena or the like, the user can view the video image with a realistic effect by the stereoscopic video image of a high frame rate.

(Operation and Effect)

As described above, according to one embodiment, in the robot 3 in a remote location, the action scene of the robot 3 is determined based on the feature amount derived from the position and motion detection data and the video data, and the video parameter corresponding to the determined action scene is selected. Then, a process of adjusting the selected video parameter on the video data is performed, and the processed video data is sent to the information processing apparatus 2 on the user side via the network 4 and displayed on the HMD 1.

Therefore, it is possible to transmit, from the robot 3 in the remote location, the video data whose video parameter has been adjusted according to the action scene of the robot 3 to the information processing apparatus 2 on the user side. Thus, the user can view a remote video image that has been subjected to the video image processing with the video parameter suitable for each action scene of the robot 3 remotely controlled by the user, and accordingly the visibility of the remote video image can be enhanced.

In addition, the process of adjusting the video parameter for the video data is autonomously performed in the robot 3. Therefore, there is an advantage whereby the user side apparatus, i.e., the information processing apparatus 2 or the HMD 1 need not be provided with a special processing function for adjusting the video parameter, so that the user can use the information processing apparatus 2 or the HMD 1 for general purpose use.

Other Embodiments (1) In the embodiment described above, an example has been described in which a video parameter suitable for an action scene determination result of the robot 3 is selected in accordance with the determination result, and the selected video parameter is adjusted to video data. However, the present invention is not limited thereto. For example, a suitable imaging mode may be selected in accordance with the determination result of the action scene of the robot 3, the selected imaging mode may be set to the camera, and the video data captured thereby may be transmitted to the user apparatus.

In general, a camera is provided with a plurality of imaging modes, for example, a mode for imaging at a low time resolution (15 FPS) and a high spatial resolution (4 K), a mode for imaging at a high time resolution (120 FPS) and a low spatial resolution (VGA), and the like.

Therefore, if the imaging mode is selectively set to the camera in accordance with the action scene of the robot 3 and imaging is performed under that condition, video data having a time resolution or a spatial resolution suitable for the action scene of the robot 3 can be transmitted to the user apparatus, and the same effect as that of the embodiment can be obtained.

(2) In the embodiment described above, an example has been described in which the robot 3 is remotely controlled in response to a remote control signal transmitted from the information processing apparatus 2. However, the present invention is not limited thereto. In a case where the robot 3 autonomously acts according to a preset program, the robot 3 may determine its own action scene, select a video parameter corresponding to the action scene, perform a process of adjusting the selected video parameter to the video data, and transmit the adjusted video data to the information processing apparatus 2 on the user side.

(3) In the embodiment described above, the memory table storing the action scene information and the video parameter information prepared in advance is provided, and the determination of the action scene and the sub-scene and the selection of the video parameter are performed with reference to the memory table. However, the present invention is not limited thereto. For example, machine learning such as deep learning may be used to select an optimal video parameter. This can be realized by, for example, extracting feature amounts from position data and motion detection data of the robot, video data, etc., inputting the extracted feature amounts to a trained learning model, and outputting an optimum video parameter from the learning model.

(4) In the embodiment described above, the information processing apparatus 2 provided separately from the HMD 1 performs data communications with the robot 3 and video image display control. However, in a case where the HMD 1 has the function of the information processing apparatus 2, that is, in a case where the HMD is integrated with the information processing apparatus 2, the HMD 1 may be configured to perform data communications with the robot 3 and video image display control.

(5) The remote operation apparatus is not limited to a humanoid robot, and a movable remote camera or a smart speaker fixedly disposed indoors or outdoors may be used. In addition, the type, configuration, and details of processing of the remote operation apparatus, the type and number of imaging modes of the camera, the type and configuration of the user apparatus, the type of the remote video image, and the like can be variously modified without departing from the scope of the present invention.

Although the embodiment of the present invention has been described in detail in the foregoing, the description is merely an example of the present invention in all of its aspects. Various improvements and modifications can be made without departing from the scope of the present invention. In other words, a specific configuration according to an embodiment may be adopted as appropriate when implementing the present invention.

In short, the present invention should not be limited to the above-described embodiments as-is, but may be embodied by modifying the components without departing from the scope of the invention at the implementation stage. In addition, various inventions may be constituted by appropriately combining a plurality of components disclosed in the embodiments. For example, some structural elements may be deleted from all the structural elements described in the embodiments. Furthermore, structural elements over different embodiments may be appropriately combined.

REFERENCE SIGNS LIST

1 . . . head mounted display (HMD)
2 . . . information processing apparatus
3 . . . robot
4 . . . network
10, 20, 30 . . . bus
11, 21, 31 . . . control unit
12, 22, 32 . . . storage unit
13 . . . display interface (display I/F)
14 . . . display unit
15, 33 . . . sensor interface (sensor I/F)
16, 35 . . . motion sensor
17, 24, 39 . . . communication interface (communication I/F)
23 . . . input/output interface (input/output I/F)
25 . . . operation unit
34 . . . camera
35 . . . motion sensor
36 . . . position sensor
37 . . . drive interface (drive I/F)
38 . . . drive unit
311 . . . remote control signal reception unit
312 . . . motion control data extraction unit
313 . . . drive control unit 314 . . . video data acquisition unit
315 . . . position/motion detection data acquisition unit
316 . . . action scene determination unit
317 . . . video image control unit
318 . . . video image processing unit
319 . . . video image transmission unit
321 . . . video data storage unit
322 . . . action scene storage unit
323 . . . video parameter storage unit

The invention claimed is:

1. A remote operation apparatus capable of communicating with a user apparatus connected to a display unit via a network, the remote operation apparatus comprising:
a controller comprising a hardware processor configured to:
acquire, from a camera, video data of a target captured by the camera;
acquire, from a sensor, state detection data representing at least one of a position or an operation of the remote operation apparatus detected by the sensor;
determine an action scene of the remote operation apparatus based on the acquired video data and the acquired state detection data;
select a video parameter to be adjusted in accordance with the determined action scene;
adjust a selected video parameter for the video data; and
transmit, to the user apparatus via the network, the video data whose video parameter has been adjusted,
wherein
the controller is configured to determine, based on the video data and the state detection data, whether the action scene is a first scene in which a target mainly in a stationary state is captured by the camera,
the controller is configured to select a spatial resolution as the video parameter or the imaging mode in a case where the action scene is determined to be the first scene, and
the controller is configured to perform a process of adjusting the selected spatial resolution for the video data or a process of setting an imaging mode for obtaining the selected spatial resolution to the camera.

2. The remote operation apparatus according to claim 1, wherein
the controller is configured to further determine whether a color tone of the target is mainly monochrome based on the video data, in a case where the action scene is determined to be the first scene,
the controller is configured to further select luminance as the video parameter, in a case where the color tone of the target is determined to be mainly monochrome, and
the controller is configured to perform a process of further adjusting the selected luminance for the video data or a process of setting an imaging mode for obtaining the selected luminance to the camera.

3. The remote operation apparatus according to claim 1, wherein
the controller is configured to further determine whether a color tone of the target is mainly color based on the video data, in a case where the action scene is determined to be the first scene,
the controller is configured to further select a color tone as the video parameter or the imaging mode, in a case where the color tone of the target is determined to be mainly color, and
the controller is configured to perform a process of further adjusting the selected color tone for the video data or a process of setting an imaging mode for obtaining the selected color tone to the camera.

4. A non-transitory computer-readable medium recording a program for causing the hardware processor included in the remote operation apparatus according to claim 1 to execute processing to be performed by the controller included in the remote operation apparatus.

5. A remote operation apparatus capable of communicating with a user apparatus connected to a display unit via a network, the remote operation apparatus comprising:
a controller comprising a hardware processor configured to:
acquire, from a camera, video data of a target captured by the camera;
acquire, from a sensor, state detection data representing at least one of a position or an operation of the remote operation apparatus detected by the sensor;
determine an action scene of the remote operation apparatus based on the acquired video data and the acquired state detection data;
select an imaging mode corresponding to the determined action scene;
set the selected imaging mode to the camera; and
transmit, to the user apparatus via the network, the video data captured by the camera using the set imaging mode,
wherein
the controller is configured to determine, based on the video data and the state detection data, whether the action scene is a first scene in which a target mainly in a stationary state is captured by the camera,
the controller is configured to select a spatial resolution as the video parameter or the imaging mode in a case where the action scene is determined to be the first scene, and
the controller is configured to perform a process of adjusting the selected spatial resolution for the video data or a process of setting an imaging mode for obtaining the selected spatial resolution to the camera.

6. The remote operation apparatus according to claim 5, wherein
the controller is configured to further determine whether a color tone of the target is mainly monochrome based on the video data, in a case where the action scene is determined to be the first scene,
the controller is configured to further select luminance as the video parameter, in a case where the color tone of the target is determined to be mainly monochrome, and
the controller is configured to perform a process of further adjusting the selected luminance for the video data or a process of setting an imaging mode for obtaining the selected luminance to the camera.

7. The remote operation apparatus according to claim 5, wherein
the controller is configured to further determine whether a color tone of the target is mainly color based on the video data, in a case where the action scene is determined to be the first scene,
the controller is configured to further select a color tone as the video parameter or the imaging mode, in a case where the color tone of the target is determined to be mainly color, and
the controller is configured to perform a process of further adjusting the selected color tone for the video data or a process of setting an imaging mode for obtaining the selected color tone to the camera.

8. A remote operation apparatus capable of communicating with a user apparatus connected to a display unit via a network, the remote operation apparatus comprising:
a controller comprising a hardware processor configured to:
acquire, from a camera, video data of a target captured by the camera;
acquire, from a sensor, state detection data representing at least one of a position or an operation of the remote operation apparatus detected by the sensor;
determine an action scene of the remote operation apparatus based on the acquired video data and the acquired state detection data;
select a video parameter to be adjusted in accordance with the determined action scene;
adjust a selected video parameter for the video data; and
transmit, to the user apparatus via the network, the video data whose video parameter has been adjusted,
wherein
the controller is configured to determine, based on the video data and the state detection data, whether the action scene is a second scene in which a target mainly in a moving state is captured by the camera,
the controller is configured to select a time resolution as the video parameter or the imaging mode in a case where the action scene is determined to be the second scene, and
the controller is configured to perform a process of adjusting the selected time resolution for the video data or a process of setting an imaging mode for obtaining the selected spatial resolution to the camera.

9. The remote operation apparatus according to claim 8, wherein
the controller is configured to determine whether the target is outdoors based on the video data, in a case where the action scene is determined to be the second scene,
the controller is configured to further select a viewing angle as the video parameter or the imaging mode, in a case where the target is determined to be outdoors, and
the controller is configured to perform a process of further adjusting the selected viewing angle for the video data or a process of setting an imaging mode for obtaining the selected viewing angle to the camera.

10. The remote operation apparatus according to claim 8, wherein
the controller is configured to determine whether the target is indoors based on the video data, in a case where the action scene is determined to be the second scene,
the controller is configured to further select a stereoscopic effect as the video parameter or the imaging mode, in a case where the target is determined to be indoors, and
the controller is configured to perform a process of further adjusting the selected stereoscopic effect for the video data or a process of setting an imaging mode for obtaining the selected stereoscopic effect to the camera.

11. A remote operation apparatus capable of communicating with a user apparatus connected to a display unit via a network, the remote operation apparatus comprising:
a controller comprising a hardware processor configured to:
acquire, from a camera, video data of a target captured by the camera;
acquire, from a sensor, state detection data representing at least one of a position or an operation of the remote operation apparatus detected by the sensor;
determine an action scene of the remote operation apparatus based on the acquired video data and the acquired state detection data;
select an imaging mode corresponding to the determined action scene;
set the selected imaging mode to the camera; and
transmit, to the user apparatus via the network, the video data captured by the camera using the set imaging mode,
wherein
the controller is configured to determine, based on the video data and the state detection data, whether the action scene is a second scene in which a target mainly in a moving state is captured by the camera,
the controller is configured to select a time resolution as the video parameter or the imaging mode in a case where the action scene is determined to be the second scene, and
the controller is configured to perform a process of adjusting the selected time resolution for the video data or a process of setting an imaging mode for obtaining the selected spatial resolution to the camera.

12. The remote operation apparatus according to claim 6, wherein
the controller is configured to determine whether the target is outdoors based on the video data, in a case where the action scene is determined to be the second scene,
the controller is configured to further select a viewing angle as the video parameter or the imaging mode, in a case where the target is determined to be outdoors, and
the controller is configured to perform a process of further adjusting the selected viewing angle for the video data or a process of setting an imaging mode for obtaining the selected viewing angle to the camera.

13. The remote operation apparatus according to claim 11, wherein
the controller is configured to determine whether the target is indoors based on the video data, in a case where the action scene is determined to be the second scene,
the controller is configured to further select a stereoscopic effect as the video parameter or the imaging mode, in a case where the target is determined to be indoors, and
the controller is configured to perform a process of further adjusting the selected stereoscopic effect for the video data or a process of setting an imaging mode for obtaining the selected stereoscopic effect to the camera.

* * * * *